United States Patent
Webb et al.

(10) Patent No.: US 7,032,376 B1
(45) Date of Patent: Apr. 25, 2006

(54) DIESEL FUEL BURNER FOR DIESEL EMISSIONS CONTROL SYSTEM

(75) Inventors: Cynthia C. Webb, San Antonio, TX (US); Jeffrey A. Mathis, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 115 days.

(21) Appl. No.: 10/685,553

(22) Filed: Oct. 14, 2003

Related U.S. Application Data (60) Provisional application No. 60/498,319, filed on Aug. 27, 2003.

(51) Int. Cl.
*F01N 3/00* (2006.01)
(52) U.S. Cl. .............. 60/297; 60/274; 60/286; 60/289; 60/290; 60/303; 55/DIG. 10; 55/DIG. 30
(58) Field of Classification Search ........... 60/274, 60/284, 286, 289, 290, 295, 297, 301, 303, 60/311; 55/DIG. 10, DIG. 30
See application file for complete search history.

(56) References Cited

U.S. PATENT DOCUMENTS

| | | | | |
|---|---|---|---|---|
| 4,571,938 A | * | 2/1986 | Sakurai | 60/303 |
| 5,320,523 A | | 6/1994 | Stark | 431/353 |
| 5,571,484 A | * | 11/1996 | Pettit et al. | 422/173 |
| 5,572,866 A | | 11/1996 | Loving | 60/274 |
| 5,617,720 A | * | 4/1997 | Achleitner et al. | 60/274 |
| 5,771,683 A | | 6/1998 | Webb | 60/274 |
| 5,826,428 A | | 10/1998 | Blaschke | 60/303 |
| 5,829,248 A | * | 11/1998 | Clifton | 60/286 |
| 6,032,461 A | * | 3/2000 | Kinugasa et al. | 60/295 |

* cited by examiner

*Primary Examiner*—Binh Q. Tran
(74) *Attorney, Agent, or Firm*—Baker Botts L.L.P.

(57) ABSTRACT

A burner for use in the emissions system of a lean burn internal combustion engine. The burner has a special burner head that enhances atomization of the burner fuel. Its combustion chamber is designed to be submersed in the engine exhaust line so that engine exhaust flows over the outer surface of the combustion chamber, thereby providing efficient heat transfer.

27 Claims, 5 Drawing Sheets

DIESEL FUEL BURNER FOR DIESEL EMISSIONS CONTROL SYSTEM

RELATED PATENT APPLICATION

This application claims the benefit of U.S. Provisional Application No. 60/498,319, filed Aug. 27, 2003 and entitled "Diesel Fuel Burner for Diesel Emissions Control System."

GOVERNMENT LICENSE RIGHTS

The U.S. Government has a paid-up license in this invention and the right in certain circumstances to require the patent owner to license others on reasonable terms as provided for by the terms of Subcontract No. NREL-NCl-31024-02 under Contact No. DE-AC36-98G010337 for the U.S. Department of Energy.

TECHNICAL FIELD OF THE INVENTION

This invention relates to emissions systems for internal combustion engines, and more particularly to using a burner in conjunction with such emissions systems.

BACKGROUND OF THE INVENTION

Internal combustion engines are a major contributor to harmful emissions. Internal combustion engines dominate land transportation propulsion—cars, trucks, off-highway vehicles, railroad, marine, motorcycles—as well as provide mechanical and electrical power for a wide range of large and small applications. The two dominant types of internal combustion engines are spark-ignition and diesel. The amount and composition of the emissions exhausted from these engines depend on the details of the processes that occur within the engine during operation, the characteristics of the fuel used, and the type of emissions control system used.

For diesel engines, the main pollutants of concern are nitrogen oxides (NOx) and particulate matter. To reduce NOx emissions, one approach is the use of NOX adsorber catalysts (NACs) in an engine exhaust system.

NACs are also sometimes referred to as lean NOx traps (LNTs), and use various reducing agents (reductants). The conversion efficiency of a NAC is a function of temperature, as well as other parameters. Testing has indicated that if a mid-to-high 90 percent conversion of NOx is desired, some NACs must operate in the 250–375 degree Centigrade range. However, the average exhaust gas temperature of a diesel vehicle under light-load operation could be much less than that range. For example, during the light-duty Federal Test Procedure, the average exhaust gas temperature of a particular diesel engine pickup truck is 160 degrees Centigrade. Therefore, some sort of thermal management is required if NAC devices are to be effectively used on that application.

SUMMARY OF THE INVENTION

In accordance with teachings of the present invention, a system and method are described for using a burner to provide supplemental heat to the post-combustion emissions system of a diesel engine. In addition to providing continuous thermal management throughout operation of the engine, the burner's heat output can be combined with post-combustion fuel injection (in-cylinder or in-exhaust) to provide fuel to burn in the catalysts, creating exotherms that are sufficiently high for regeneration of a catalyst-based diesel particulate filter (DPF). The combination of the burner and fuel injection (in-exhaust) and an additional oxidation catalyst can further provide exotherms that are sufficiently high for regeneration or desulfation of a NOx adsorber catalyst (NAC). The latter combination can also be further used to remove excess oxygen from the exhaust while simultaneously reducing the size of larger hydrocarbon reductants, through oxidation, creating CO and smaller hydrocarbons to provide rich exhaust conditions, in the absence of oxygen, to the NAC for regeneration. These configurations perform the above functions while remaining transparent to the operator of the engine.

The use of the burner, especially when combined with other emission control devices, is especially useful for car and truck applications in which the engine is operated at light loads, resulting in exhaust gas temperatures that are too low for emission control lacking some kind of thermal management. In particular, the burner systems and methods are useful when a NOx adsorber catalyst is used and it is undesirable to operate the engine rich.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The invention described herein is directed to the design and operation of a burner device, which is used to maintain an appropriate temperature window of operation for emissions devices that require heat for proper operation and/or regeneration. The burner is typically used in the emissions system of a diesel engine, but is suitable for use in the emissions system of any lean burn internal combustion engine.

As explained below, the power output of the burner is variable to allow for higher temperatures during NAC regeneration or desulfation. The burner provides controllable main air flow and provides a large turn-down ratio, that is, a wide range of stable AFR (air-to-fuel ratio) and flow operation.

Figure 1:
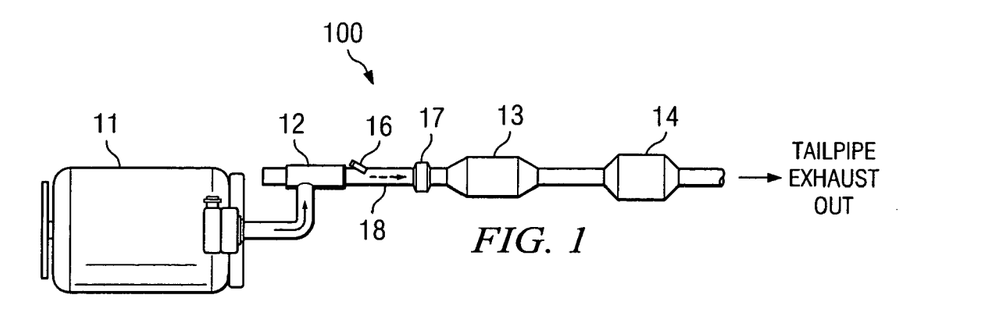
FIG. 1 schematically illustrates an emissions system for a diesel engine, having a burner in accordance with the invention.

FIG. 1 illustrates an emissions system 100 for a diesel engine 11, having a burner 12 in accordance with the invention. System 100 is a "post combustion" emissions system, in that it is located downstream of engine 11 and treats exhaust from engine 11. System 100 is a single path system, as compared to the dual path systems described below in connection with FIGS. 6 and 7.

System 100 has a $NO_x$ adsorber catalyst (NAC) 13 downstream of engine 11, followed by a diesel particulate filter (DPF) 14. Both NAC 13 and DPF 14 may be implemented devices known or to be developed in the art of engine emissions control. Devices for implementing NAC 13 are also known as lean $NO_x$ traps (LNTs).

NOx adsorber catalyst (NAC) 13 has three operational stages. The first is a precious metal oxidation catalyst that is responsible for converting nitric oxide (NO) to nitrogen dioxide (NO2). The second stage is a base metal oxide NO2 trap that requires periodic regeneration by enriching the exhaust flow to the NAC 13. Even when not regenerating, this stage requires a certain temperature to be maintained for proper operation. The third stage reduces NO2 released during regeneration to N2 and H2O under proper exhaust conditions.

As stated in the Background, the efficiency of NAC 13 is a function of the exhaust gas temperature among other parameters. For a typical diesel engine 11, if a mid-to-high 90 percent conversion of $NO_x$ is desired, a NAC using today's technology usually needs to operate in a range of 250–375 degrees centigrade. However, for a typical "light load" vehicle engine 11, the average operating temperature may be well below that range. Thus, some sort of thermal management is required to ensure that NAC 13 is operating at peak efficiency.

NAC 13 requires regeneration when its NOx levels reach a certain extent. Typically, this may occur as frequently as every 60–100 seconds with a regeneration period of less than 10 seconds. Generally, NAC regeneration is accomplished by changing the composition of the exhaust. Specifically, regeneration is best accomplished by reducing the oxygen in the diesel exhaust stream entering NAC 13, such that the exhaust is rich. As explained below, the removal of oxygen and the addition of a reducing agent, provide the proper conditions for regeneration of the NAC 13.

Diesel particulate filter (DPF) 14 traps particulate mass emission in the exhaust. To ensure that DPF 14 remains efficient and does not fill up with soot, it is necessary to monitor the differential pressure across DPF 14 and to force regeneration when (and if) necessary. A typical regeneration frequency may be every few days to a month with a regeneration period of typically 15 to 30 minutes. DPF regeneration may require a temperature at the DPF as high as 600 degrees centigrade. If it is determined that regeneration is needed, and the temperature of the DPF 14 is not at the level needed for regeneration, burner 12 may be used to increase the exhaust temperature.

Thus, burner 12 is used for supplemental heat generation, and may operate on the fuel source of engine 11. Fuel burner 12 has a high efficiency of conversion of fuel energy to heat energy, and can be located in close proximity to the emissions system 100, thereby reducing heat loss between the point of heat generation and heat transfer to the emission system 100.

Burner 12 is used for general thermal management of emissions system 100, that is, continuous thermal management that is not limited to engine startup. In other words, burner 12 maintains a desired temperature in NAC 13 during its normal operation. As indicated above, the NAC operation temperature provided by burner 12 is in the range of 250–375 degrees centigrade.

To regenerate NAC 13, burner 12, supplemental fuel injector 16, and oxidation catalyst 17 (or some combination of these) are used. Engine 11 is not well adapted to running under the rich conditions needed for regeneration, particularly at light loads. However, burner 12 is well suited for rich operation. Running burner 12 rich generates unburned and partially burned hydrocarbons and carbon monoxide (CO). Running burner 12 rich also reduces the overall content of oxygen in the exhaust, which further assists NAC regeneration. Additionally, burner 12 is designed to maintain a desired temperature during regeneration.

During NAC regeneration, and while burner 12 is running rich, a pre-catalyst 17 downstream of burner 12 and upstream of NAC 13, can be useful in reducing some of the unburned hydrocarbons from burner 12. Once overall rich conditions are achieved, the pre-catalyst 17 can be used to generate CO from the unburned hydrocarbons and engine exhaust oxygen. This helps to not only create overall rich conditions, but removes excess O2 from the exhaust prior to its entering NAC 13. It is believed that CO may be a preferred reductant for NAC regeneration. An example of a suitable pre-catalyst 17 is a small oxidation catalyst.

Additionally, during NAC regeneration, a supplemental fuel injector 16, upstream of the pre-catalyst 17, can be used to enhance the available reductant and to accelerate the transition from lean to rich conditions.

Thus, for regeneration of NAC 13, burner 12 is used to provide additional heat. It burns rich as described above to increase hydrocarbons and reduce oxygen. The pre-catalyst 17 further helps remove oxygen and generate CO. The exhaust entering NAC 13 now has reduced oxygen content and an increased content of lighter weight hydrocarbons and CO.

For regeneration of DPF 14, output from burner 12 combined with post-combustion fuel injection, is expected to provide exotherms sufficiently high for regeneration of a catalyst-based DPF 14. The post-combustion fuel injection could be in-cylinder or in-exhaust by supplemental fuel injector 16.

Figure 1A:
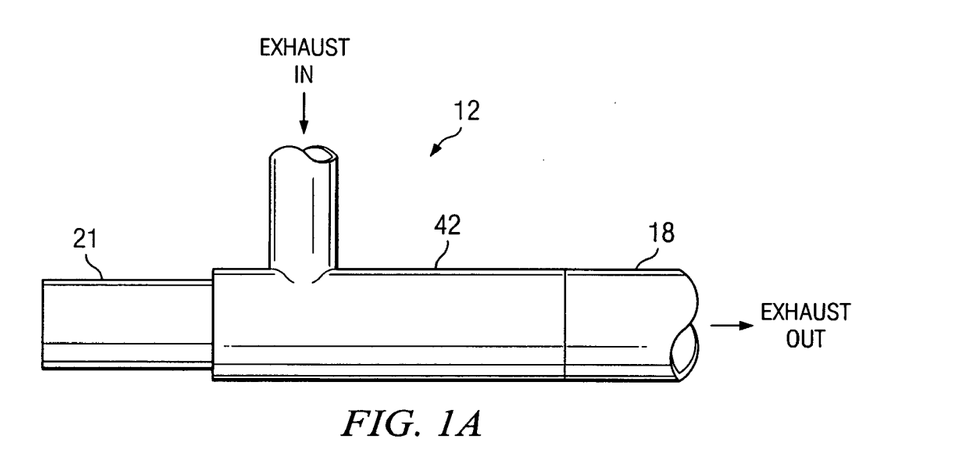
FIG. 1A is a perspective view of how the burner head is attached to the exhaust line.

FIG. 1A is a perspective view of the connection of burner 12 to exhaust pipe 18. Referring to both FIGS. 1 and 1A, burner 12 is a tube-type burner which operates in parallel to the exhaust system 100, to prevent backpressure increases. Burner 12 comprises a burner head 21 and a combustion chamber 42.

In the embodiments of this description, burner 12 meets the engine exhaust line 18 at a right angle such that the burner head 21 attaches at the corner of the right angle and the combustion chamber 42 fits inside the exhaust line 18. Combustion chamber 42 is essentially a hollow cylinder whose outer diameter is smaller than that of the portion of exhaust line 18 surrounding it.

In the example of this description, burner head 21 and combustion chamber 42 are "in-line", that is, they are on the same longitudinal axis. This facilitates attachment of burner 12 to a port at a corner of exhaust line 18, as shown in FIG. 1A. In other embodiments, burner head 21 and combustion chamber 42 might have some other configuration that would permit combustion chamber 42 to be submersed in exhaust line 18, such as being at right angles to each other.

Figure 2:
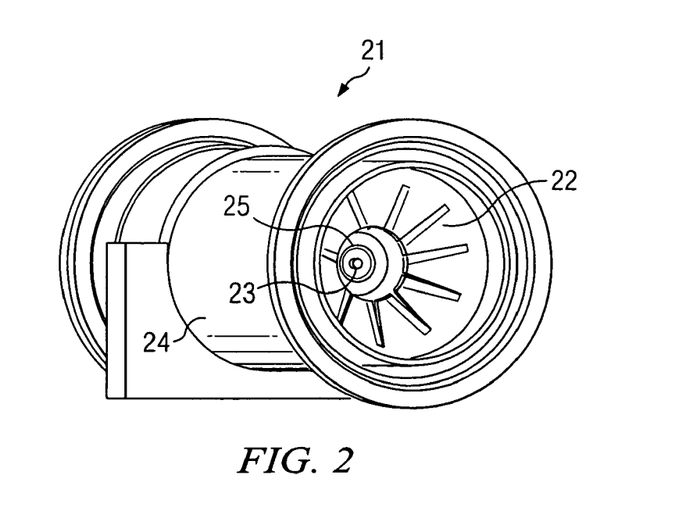
FIG. 2 is a perspective view of the combustion end of the burner of FIG. 1.
Figure 3:
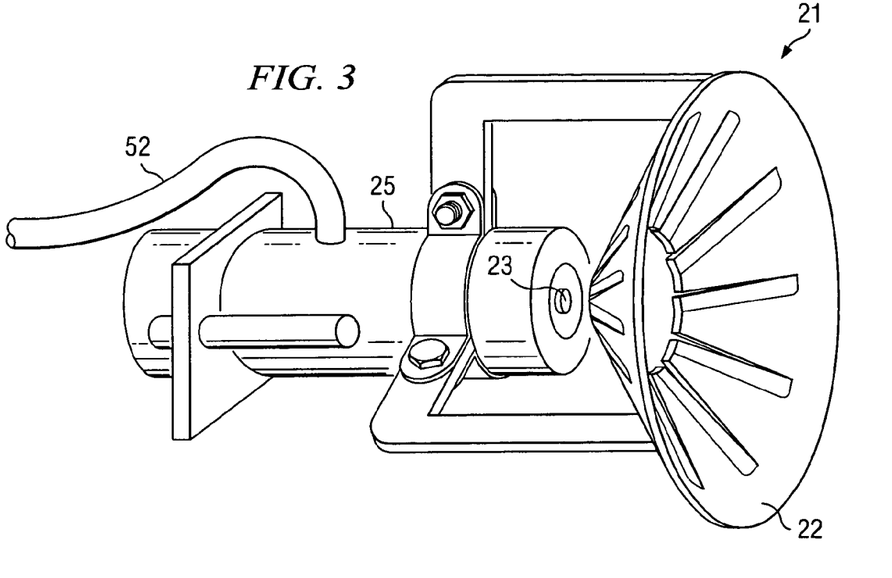
FIG. 3 is a perspective view of the combustion end of the burner of FIG. 1, but with the outer housing removed.
Figure 4:
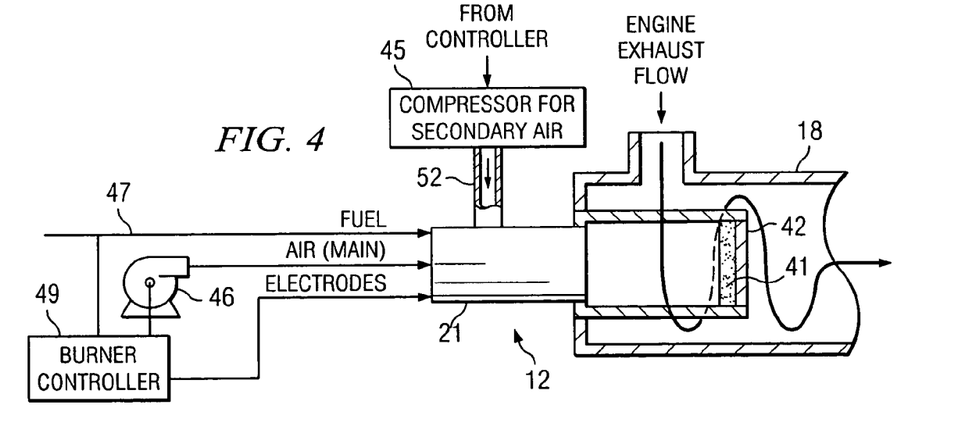
FIG. 4 is a cross sectional view of the burner in place within the exhaust system of FIG. 1.

FIGS. 2 and 3 are perspective views of the burner head 21 of burner 12. FIG. 4 is a cross sectional view of burner 12 in place within exhaust system 100.

More specifically, FIG. 2 illustrates the combustion end of an assembled burner head 21, removed from its attachment at a port of exhaust line 18. An air bonnet 22, fuel injector 23, outer housing 24, and sleeve 25 are visible in this view. Housing 24 encloses bonnet 22 at one end of housing 24, and housing 24 further encloses the fuel injector 23. Bonnet 22 is at the flame end of fuel injector 23. Sleeve 25 fits around the length of fuel injector 23. FIG. 3 illustrates the burner head 21 with its outer housing 24 removed.

Referring to both FIGS. 1A and 4, combustion chamber 42 is "submersed" in the engine exhaust. This permits exhaust to circulate around the outside of the combustion chamber 42. The combustion chamber wall is cooled and heat is efficiently transferred to the exhaust gas. In this manner, the combusted fuel heat, as well as radiant heat emitted from the combustion chamber wall, are transferred to the exhaust. This limits heat loss during the combustion process. Another heat path is where exhaust pipe 18 transfers heat to the oxidation catalyst 17.

As indicated in FIG. 4, fuel and air enter the burner head 21 at the non-combustion end, that is, the end that does not join exhaust line 18. Fuel supply 47 provides fuel from the same fuel source as used for engine 11 (diesel fuel). Air line 48 provides air into the interior of housing 24. As explained below, a secondary air line provides air directly to fuel injector 23 inside sleeve 25.

Flame stabilizer 41 is a section of ceramic foam (SiC), placed at one end of combustion chamber 42. The foam is used to stabilize and contain the flame within the chamber 42, thus preventing the flame from contacting pre-catalyst 17, even if burner 12 were to be very closely coupled to catalyst 17. Stabilizer 41 is also used to provide a surface for combustion of large fuel droplets, to reduce the impact of engine exhaust pulsations on the burner flame structure, to flatten the burner exit temperature profile, and once hot, to assist in re-ignition of the burner flame, if necessary. Additional details regarding flame stabilization are described in U.S. Pat. No. 5,771,683, entitled "Active Porous Medium Aftertreatment Control System", to C. Webb.

Flame stabilizer 41 is optional. In other embodiments, the end of combustion chamber 42 could be partially blocked for flame stabilization with some other non combustible material.

Figure 5:
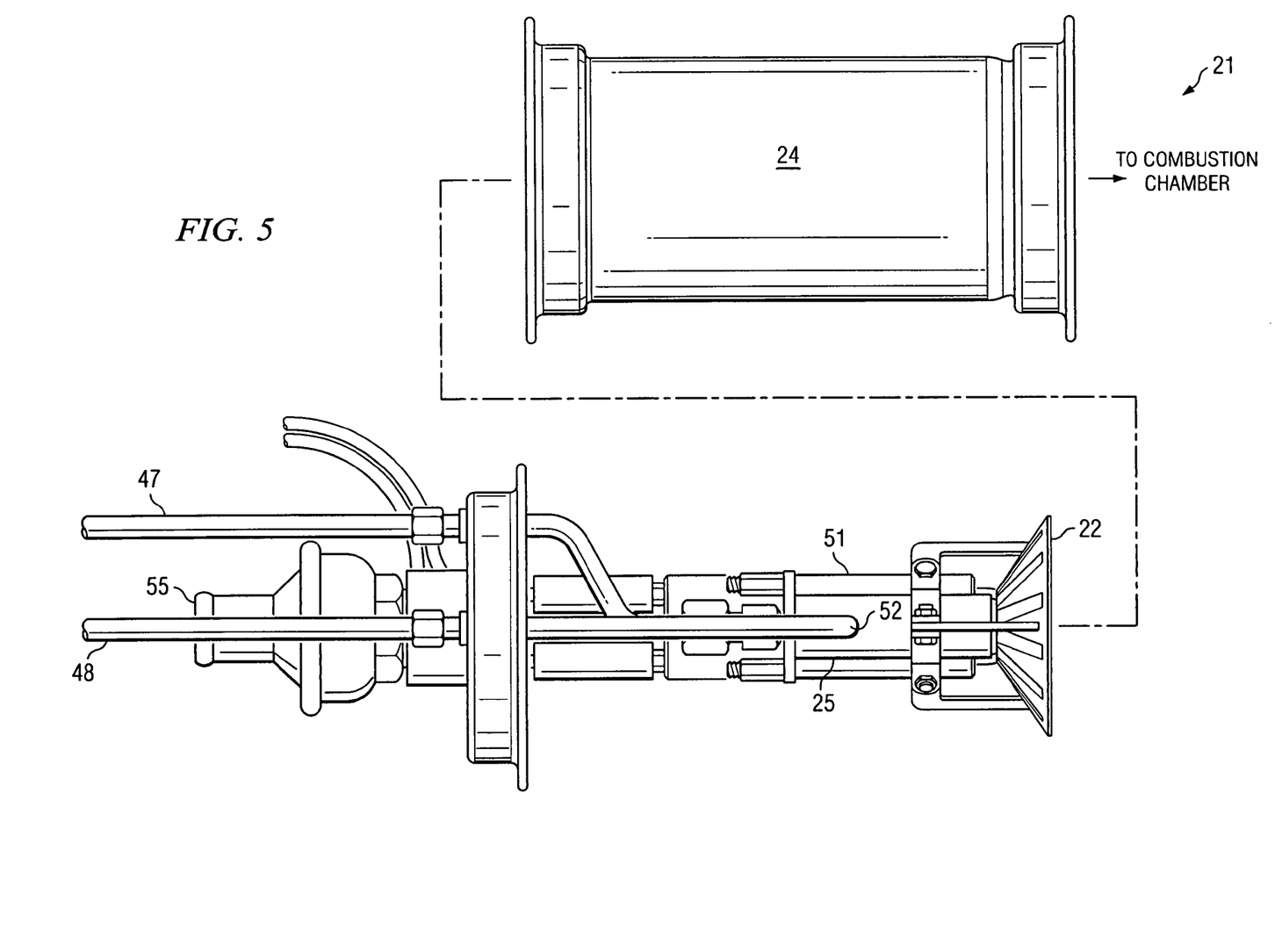
FIG. 5 illustrates the housing and internal components of the burner head of the burner.
Figure 5A:
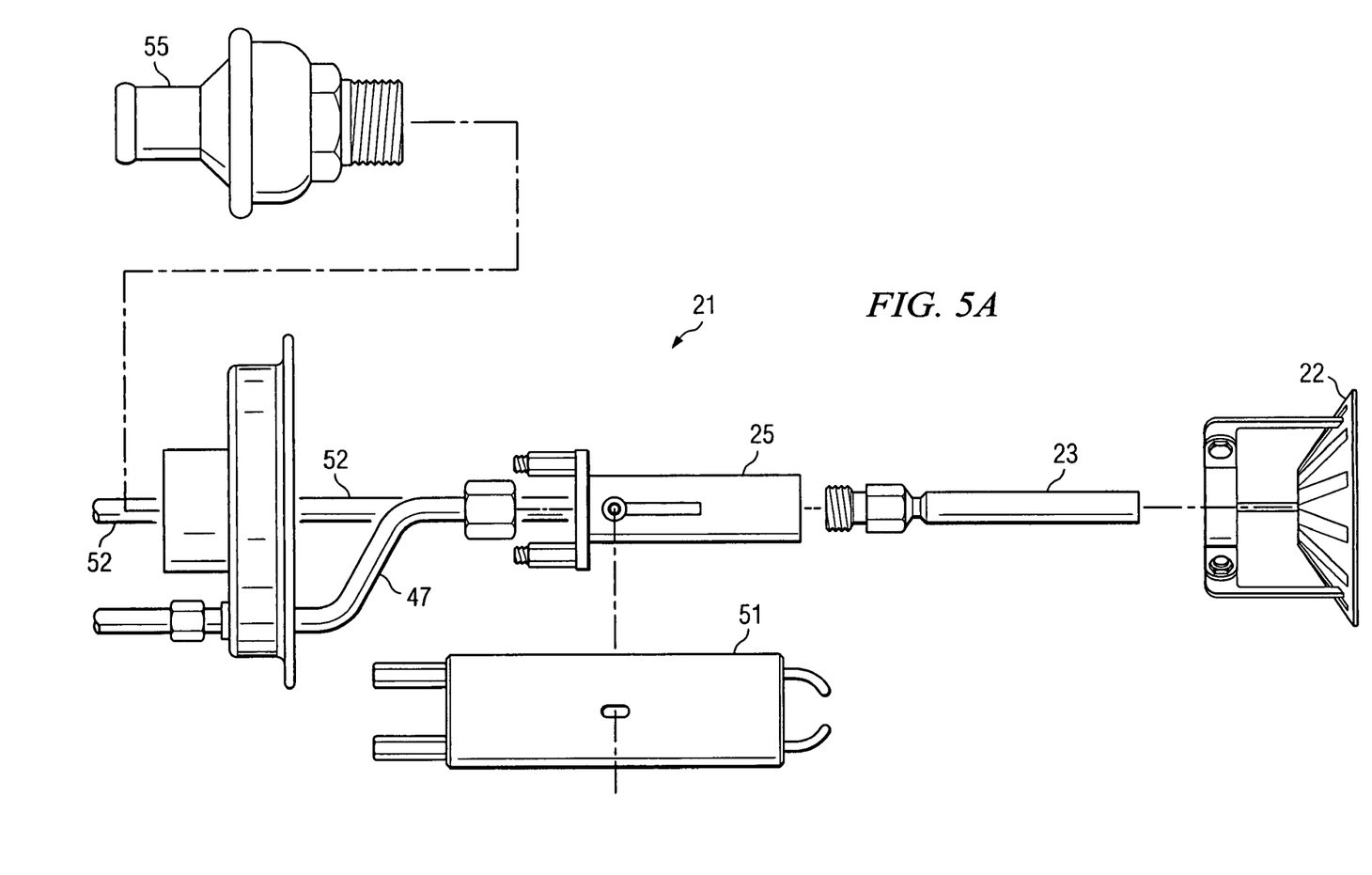
FIG. 5A is an exploded view of the internal components of FIG. 5.

FIGS. 5 and 5A illustrate the components of burner head 21. In FIG. 5, housing 24 is shown removed from the rest of burner head 21. FIG. 5A is an exploded view of the components of burner head 21 inside housing 24. The main air supply into burner head 21 is via an input port and check valve 55.

Air bonnet 22 is placed at the combustion end of burner 21 with the flame end of fuel injector 23 at its center. To achieve better atomization, compressed air flows through a pattern of openings in air bonnet 22 when the fuel injector 23 is ignited. The compressed air is provided into sleeve 25 via air line 52.

Fuel injector 23 is placed within sleeve 25. An example of a suitable fuel injector 23 is a K-Jetronic fuel injector manufactured by Bosch Corporation. Modulation is achieved using a frequency valve. Fuel injector 23 has rapid-shut off of fuel. It has a poppet valve design, which tends to be more heat tolerant than a needle-lift type of injector.

Figure 5B:
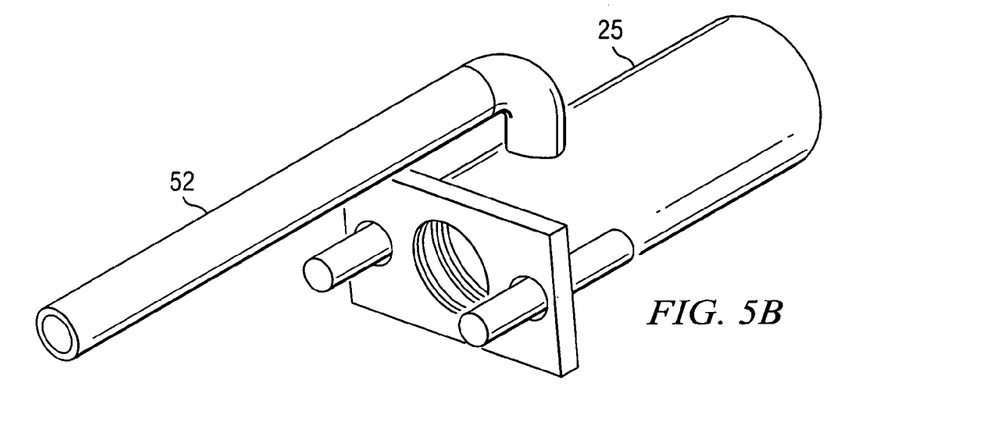
FIG. 5B illustrates the sleeve of the burner, shown without the internal fuel injector.

FIG. 5B illustrates fuel injector sleeve 25, shown without the internal fuel injector 23. Sleeve 25 operates to hold and seal fuel injector 23, and to provide a means for forcing air through bonnet 22. A secondary air line 52 provides air directly into sleeve 25. Sleeve 25 further provides a mounting for bonnet 22 and the burner electrodes 51 used for igniting fuel injector 23. With the use of sleeve 25 and secondary air line 52, the fuel into burner 12 is better atomized, that is, the fuel droplets are smaller. Electrodes 51 are connected to the electrode wires 46 shown in FIG. 4, which extend from the back of burner head 21.

Referring again to FIG. 4, a burner controller 49 can be programmed to provide various control signals to control the fuel, air, and electrode inputs to burner 12. These control signals provide for control of activation and variation of the fuel rate, air assist and burner air pressure and flow, and spark activation. Controller 49 can be integrated with other engine control units if desired.

Fuel control is achieved by pulse width modulating a fuel valve (not shown) on fuel line 47. The main and secondary air inputs to burner 21 are compressed air. The main air need only have low pressure for which pump 46 is adequate. The secondary air may be provided by a compressor 45, which permits pressure as high as 20 psi. Higher secondary air pressure provides finer atomization, and in practice the air pressure is determined by balancing the desirable fine atomization with the less desirable effect of a longer flame. Proper air and fuel adjustment to burner 12 will help minimize back pressure.

In operation, burner 12 is lit at reduced, but non-zero air pressure through secondary air line 52. The secondary air pressure is increased after the burner is lit, for atomizing the input air. The main air flow rate is controlled by controller 49, using an IP regulator 55. This main air flow begins at a low flow rate, but the rate is increased as the burner flame stabilizes. Controller 49 controls the timing of electrodes, fuel, and air (assist and main) for every lighting sequence.

As stated above, one advantage of fuel burner 12 is the wide range of stable operation (both in air and fuel flow) that burner 12 offers. Fuel and air can be adjusted to control the burner output. This wide range of operation permits fuel burner 12 to provide a wide range of temperature as well as AFR (air to fuel ratio). The ability to change the AFR is especially useful for creating the rich exhaust gas composition needed for periodic regeneration of NAC 13. The ability to increase the burner temperature permits regeneration of DPF 14, with a burner output from 450–600 degrees centigrade.

In the embodiment of FIG. 1, burner 12 burns air introduced from the environment external to exhaust system 100. In other embodiments, it may be possible to position burner 12 such that the main air supply is exhaust rather than externally obtained air. This could be accomplished by placing burner 12 in line with the exhaust flow or by using a bypass.

Figure 6:
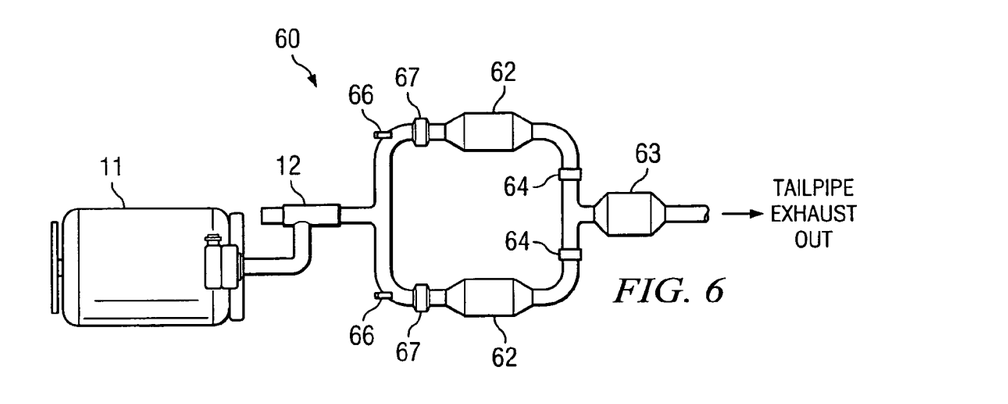
FIGS. 6 and 7 are alternative embodiments of emissions systems, having dual paths for the NOx adsorber catalysts.
Figure 7:
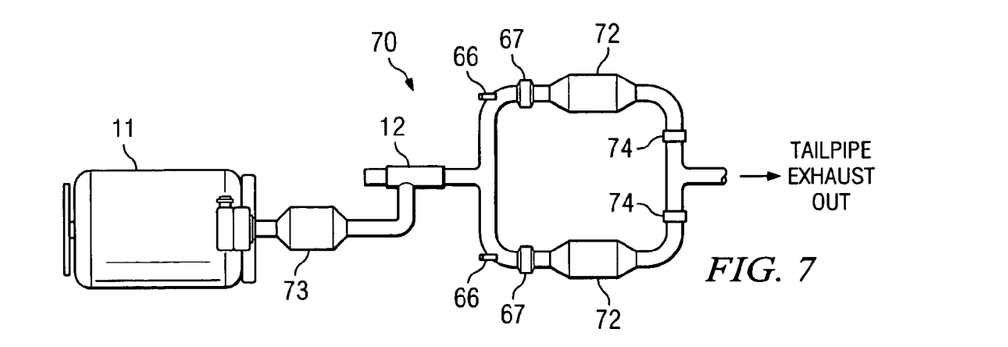

FIGS. 6 and 7 are alternative embodiments of emissions systems 60 and 70, each having a burner 12 in accordance with the invention. In FIG. 6, the emissions system 60 is a dual path system, with two pre-catalysts 51 and two NACs 62 on split paths. These paths join prior to the DPF 63. Valves 64 control the flow in each path. During regeneration of one NAC 62, the path being regenerated is closed, and the SFI 76 on that path provides additional fuel. Pre-catalysts 67 are then used to remove oxygen from the exhaust gas prior to entry into the NAC 62. Thus, the exhaust stream into the NAC 62 to be regenerated has no oxygen and extra hydrocarbons and CO.

In FIG. 7, the dual path design is used for NACs 72, but the DPF 73 is placed upstream of NACs 72, with its output providing the exhaust gas burned by burner 12.

What is claimed is:

1. A burner for use in a post combustion emissions system for an internal combustion engine, the system having an exhaust line from the engine, comprising:
   a burner head having a tubular outer housing, the outer housing containing: an air bonnet at the combustion end of the outer housing, a fuel injector operable to provide atomized fuel at the center of the air bonnet, a air assist sleeve surrounding the length of the fuel injector and operable to receive compressed air, and a pair of electrodes operable to ignite fuel provided by the fuel injector;
   wherein the outer housing is open at the combustion end of the outer housing, the open end suitable for attachment to a port of the exhaust line; and
   a combustion chamber extending from the combustion end of the outer housing, the chamber being open to a flame provided by the burner head and open at the opposing end such that heated air from the flame enters the exhaust line, but otherwise enclosed;
   wherein the combustion chamber extends into the exhaust line such that exhaust in the exhaust line flows substantially perpendicularly against at least a portion of the outer surface of the combustion chamber.

2. The burner of claim 1, wherein the combustion chamber has a ceramic foam flame stabilizer at the end opposing the combustion end.

3. The burner of claim 1, wherein the fuel injector is a poppet valve type fuel injector.

4. The burner of claim 1, wherein the burner is operable to burn diesel fuel.

5. The burner of claim 1, wherein the air bonnet has openings for delivering air to the flame end of the fuel injector.

6. The burner of claim 1, wherein the outer housing has a main air intake port into the housing and wherein the air assist sleeve has a secondary air intake port.

7. The burner of claim 1, wherein the main air intake port receives at least part of the engine exhaust.

8. The burner of claim 1, wherein the main air intake port receives air obtained externally to the exhaust system.

9. The burner of claim 1, wherein the combustion chamber is submersed in the exhaust line such that exhaust circulates around the combustion chamber.

10. The burner of claim 1, wherein the combustion chamber is along the same longitudinal axis as a portion of the exhaust line.

11. The burner of claim 1, wherein the burner is installed at a corner of the exhaust line.

12. An emissions system for a diesel engine having an exhaust system with a single-path exhaust line from the engine, the emissions system comprising:
   a burner head having a tubular outer housing, the outer housing containing: an air bonnet at the combustion end of the outer housing, a fuel injector operable to provide atomized fuel at the center of the air bonnet, a air assist sleeve surrounding the length of the fuel injector and operable to receive compressed air, and a pair of electrodes operable to ignite fuel provided by the fuel injector;
   wherein the outer housing is open at the combustion end of the outer housing, the open end suitable for attachment to a port of the exhaust line;
   a combustion chamber extending from the combustion end of the outer housing and open to a flame provided by the burner head, but otherwise enclosed;
   wherein the combustion chamber extends into the exhaust line such that exhaust from the engine may flow over at least a portion of the outer surface of the combustion chamber;
   a NOx adsorber catalyst downstream of the combustion chamber; and
   a supplemental fuel injector operable to deliver fuel into the exhaust line between the burner and the NOx adsorber catalyst.

13. The system of claim 12, further comprising an oxidation catalyst between the burner and the NOx adsorber catalyst.

14. An emissions system for a diesel engine having an exhaust system with a dual-path exhaust line from the engine, the emissions system comprising:
   a burner head having a tubular outer housing, the outer housing containing: an air bonnet at the combustion end of the outer housing, a fuel injector operable to provide atomized fuel at the center of the air bonnet, a air assist sleeve surrounding the length of the fuel injector and operable to receive compressed air, and a pair of electrodes operable to ignite fuel provided by the fuel injector;
   wherein the outer housing is open at the combustion end of the outer housing, the open end suitable for attachment to a port of the exhaust line;
   a combustion chamber extending from the combustion end of the outer housing and open to a flame provided by the burner head, but otherwise enclosed;
   wherein the combustion chamber extends into the exhaust line such that exhaust from the engine may flow over at least a portion of the outer surface of the combustion chamber;
   a NOx adsorber catalyst on each path of the exhaust line, downstream of the combustion chamber; and
   a supplemental fuel injector on each path of the exhaust line, operable to deliver fuel into the exhaust line between the burner and a NOx adsorber catalyst.

15. The system of claim 14, further comprising an oxidation catalyst on each path of the exhaust line, between the burner and the NOx adsorber catalyst.

16. The system of claim 14, further comprising a particulate filter downstream the NOx adsorber catalysts.

17. The system of claim 14, further comprising a particulate filter upstream the combustion chamber.

18. A method of reducing emissions from engine exhaust of a lean burn internal combustion engine, the engine having an emissions systems with an exhaust line and a NOx adsorber catalyst (NAC), comprising the steps of:
   attaching a burner head to a port in the exhaust line upstream the NAC, the burner head operable to provide a flame to a combustion chamber;
   inserting the combustion chamber into the exhaust line, such that the combustion chamber of the burner is immersed in the exhaust line, and such that exhaust flows over at least a portion of the outer surface of the combustion chamber;
   installing a supplemental fuel injector for delivering fuel into the exhaust line between the burner and the NAC;
   using the burner to maintain an appropriate operating temperature for the NAC; and
   using the supplemental fuel injector to deliver fuel into the exhaust line during regeneration of the NAC.

19. The method of claim 18, wherein the operating temperature is in a range of 250–375 degrees centigrade.

20. The method of claim 18, further comprising the step of controlling the air-to-fuel ratio of the burner.

21. The method of claim 20, wherein the controlling step is performed by providing a rich air-to-fuel ratio during regeneration of the NAC.

22. The method of claim 20, wherein the emissions system further has a particulate filter, and further comprising the step of increasing the temperature output of the burner to a temperature suitable for regeneration of the particulate filter.

23. The method of claim 20, wherein the burner comprises a fuel injector surrounded by a sleeve, and further comprising the step of providing compressed air into the sleeve.

24. The method of claim 20, further comprising the step of installing an oxidation catalyst on the exhaust line between the burner and the NAC, and using the oxidation catalyst to at least partially oxidize the exhaust gas during regeneration of the NAC.

25. The method of claim 20, further comprising the step of controlling the fuel to the burner such that the burner runs more rich during regeneration of the NAC.

26. The method of claim 20, wherein the burner is operated for continuous thermal management during engine operation, and including light load operation.

27. The method of claim 20, further comprising the steps of installing a particulate filter downstream the burner, and of raising the burner output temperature to a range of at least 450–600 degrees during regeneration of the filter.

* * * * *